US010037457B2

(12) United States Patent
Tang et al.

(10) Patent No.: US 10,037,457 B2
(45) Date of Patent: Jul. 31, 2018

(54) METHODS AND SYSTEMS FOR VERIFYING FACE IMAGES BASED ON CANONICAL IMAGES

(71) Applicant: Beijing SenseTime Technology Development Co., Ltd, Beijing (CN)

(72) Inventors: Xiaoou Tang, Shatin (CN); Zhenyao Zhu, Shatin (CN); Ping Luo, Shatin (CN); Xiaogang Wang, Shatin (CN)

(73) Assignee: Beijing SenseTime Technology Development Co., Ltd, Beijing (CN)

( * ) Notice: Subject to any disclaimer, the term of this patent is extended or adjusted under 35 U.S.C. 154(b) by 15 days.

(21) Appl. No.: 15/282,851

(22) Filed: Sep. 30, 2016

(65) Prior Publication Data
US 2017/0083754 A1    Mar. 23, 2017

Related U.S. Application Data

(63) Continuation of application No. PCT/CN2014/000389, filed on Apr. 11, 2014.

(51) Int. Cl.
*G06K 9/00* (2006.01)
*G06K 9/62* (2006.01)
(Continued)

(52) U.S. Cl.
CPC ..... *G06K 9/00288* (2013.01); *G06K 9/00281* (2013.01); *G06K 9/4628* (2013.01);
(Continued)

(58) Field of Classification Search
USPC ................................. 382/118, 158, 160, 195
See application file for complete search history.

(56) References Cited

U.S. PATENT DOCUMENTS

| 6,829,384 B2* | 12/2004 | Schneiderman ..... G06K 9/3241 375/240.19 |
| 7,564,994 B1* | 7/2009 | Steinberg .......... G06F 17/30247 340/5.53 |

(Continued)

OTHER PUBLICATIONS

Timo Ahonen et al., "Face Description with Local Binary Patterns: Application to Face Recognition," IEEE Transactions on Pattern Analysis and Machine Intelligence, vol. 28, No. 12, pp. 2037-2041, Dec. 2006, 5 pages.

(Continued)

*Primary Examiner* — Kathleen Y Dulaney
(74) *Attorney, Agent, or Firm* — Kilpatrick Townsend & Stockton LLP

(57) ABSTRACT

Disclosed herein are a system and method for verifying face images based on canonical images. The method includes: retrieving, from a plurality of face images of an identity, a face image with a smallest frontal measurement value as a representative image of the identity; determining parameters of an image reconstruction network based on mappings between the retrieved representative image and the plurality of face images of the identity; reconstructing, by the image reconstruction network with the determined parameters, at least two input face images into corresponding canonical images respectively; and comparing the reconstructed canonical images to verify whether they belong to a same identity, where the representative image is a frontal image and the frontal measurement value represents symmetry of each face image and sharpness of the image. Thus, canonical face images can be reconstructed using only 2D information from face images under an arbitrary pose and lighting condition.

18 Claims, 4 Drawing Sheets

(51) Int. Cl.
G06K 9/66 (2006.01)
G06K 9/46 (2006.01)
G06T 7/143 (2017.01)
G06T 7/68 (2017.01)

(52) U.S. Cl.
CPC ............ *G06T 7/143* (2017.01); *G06T 7/68* (2017.01); *G06T 2207/20084* (2013.01); *G06T 2207/30201* (2013.01)

(56) References Cited

U.S. PATENT DOCUMENTS

| | | | | |
|---|---|---|---|---|
| 2001/0033675 | A1* | 10/2001 | Maurer | G06K 9/00228 382/103 |
| 2004/0066966 | A1* | 4/2004 | Schneiderman | G06K 9/527 382/159 |
| 2007/0086627 | A1* | 4/2007 | Kim | G06K 9/00241 382/118 |
| 2009/0003661 | A1* | 1/2009 | Ionita | G06K 9/00281 382/118 |
| 2011/0206246 | A1* | 8/2011 | Wolf | G06F 19/24 382/118 |
| 2012/0288166 | A1* | 11/2012 | Sun | G06K 9/00281 382/118 |
| 2013/0266195 | A1* | 10/2013 | Shiell | G06K 9/00281 382/118 |

OTHER PUBLICATIONS

Shervin Rahimzadeh Arashloo et al., "Energy Normalization for Pose-Invariant Face Recognition Based on MRF Model Image Matching," IEEE Transactions on Pattern Analysis and Machine Intelligence, vol. 33, No. 6, pp. 1274-1280, Jun. 2011, 7 pages.
Ahmed Bilal Ashraf et al. , "Learning Patch Correspondences for Improved Viewpoint Invariant Face Recognition," IEEE Conference on Computer Vision and Pattern Recognition(CVPR), Jun. 2008, 8 pages.
A. Asthana et al., "Fully Automatic Pose-Invariant Face Recognition via 3D Pose Normalization," Mitsubishi Electric Research Laboratories, International Conference on Computer Vision (ICCV), Nov. 2011, 10 pages.
Oren Barkan et al., "Fast High Dimensional Vector Multiplication Face Recognition," International Conference on Computer Vision (ICCV), Dec. 2013, pp. 1960-1967, 8 pages.
Amir Beck et al., "A Fast Iterative Shrinkage-Thresholding Algorithm for Linear Inverse Problems," SIAM J. Imaging Sciences, vol. 2, No. 1, pp. 183-202, 2009, 20 pages.
Peter N. Belhumeur et al., "Eigenfaces vs. Fisherfaces: Recognition Using Class Specific Linear Projection," IEEE Transactions on Pattern Analysis and Machine Intelligence, vol. 19, No. 7, pp. 711-720, Jul. 1997, 10 pages.
Thomas Berg et al., "Tom-vs-Pete Classifiers and Identity-Preserving Alignment for Face Verification," 2012, 11 pages.
Volker Blanz et al., "Face Recognition based on a 3D Morphable Model," 7th International Conference on Automatic Face and Gesture Recognition, Apr. 2006, 6 pages.
Xudong Cao et al., "A Practical Transfer Learning Algorithm for Face Verification," International Conference on Computer Vision (ICCV), 2013, pp. 3208-3215, 8 pages.
Zhimin Cao et al., "Face Recognition with Learning-based Descriptor," IEEE Conference on Computer Vision and Pattern Recognition(CVPR), Jun. 2010, 8 pages.
Dong Chen, "Blessing of Dimensionality: High-dimensional Feature and Its Efficient Compression for Face Verification, " IEEE Conference on Computer Vision and Pattern Recognition(CVPR), 2013, 8 pages.
Dong Chen et al., "Bayesian Face Revisited: A Joint Formulation," 12th European Conference on Computer Vision, Oct. 2012, pp. 566-579, 14 pages.

Sumit Chopra et al., "Learning a Similarity Metric Discriminatively, with Application to Face Verification," IEEE Conference on Computer Vision and Pattern Recognition(CVPR), Jun. 2005, 8 pages.
Zhen Cui et al., "Sparsely encoded local descriptor for face verification," Neurocomputing, 147(2015), pp. 403-411, available Jul. 2014, 9 pages.
Navneet Dalal et al., "Histograms of Oriented Gradients for Human Detection," IEEE Conference on Computer Vision and Pattern Recognition(CVPR), Jun. 2005, 8 pages.
John G. Daugman, "Uncertainty relation for resolution in space, spatial frequency, and orientation optimized by two-dimensional visual cortical filters," J. Opt. Soc. Am. A, vol. 2, No. 7, pp. 1160-1169, Jul. 1985, 10 pages.
Christoph Goller et al., "Learning Task-Dependent Distributed Representations by Backpropagation Through Structure," IEEE Conference on Neural Networks, Jun. 1996, pp. 347-352, 6 pages.
Tal Hassner, "Viewing Real-World Faces in 3D," International Conference on Computer Vision (ICCV), Dec. 2013, pp. 3607-3614, 8 pages.
Geoffrey E. Hinton et al., "A fast learning algorithm for deep belief nets," Neural Computation, vol. 18, No. 7, Jul. 2006, 16 pages.
G. E. Hinton et al., "Reducing the Dimensionality of Data with Neural Networks," Science Magazine, vol. 313, pp. 504-507, Jul. 28, 2006, 4 pages.
Gary B. Huang et al., "Learning Hierarchical Representations for Face Verification with Convolutional Deep Belief Networks," IEEE Conference on Computer Vision and Pattern Recognition (CVPR), Jun. 2012, pp. 2518-2525, 8 pages.
Viren Jain et al., "Natural Image Denoising with Convolutional Networks," Neural Information Processing Systems Conference, Dec. 2008, pp. 769-776, 8 pages.
Alex Krizhevsky et al., "ImageNet Classification with Deep Convolutional Neural Networks," Neural Information Processing Systems Conference, Dec. 2012, 9 pages.
Neeraj Kumar et al., "Attribute and Simile Classifiers for Face Verification," International Conference on Computer Vision (ICCV), Sep.-Oct. 2009, 8 pages.
Honglak Lee et al., "Convolutional Deep Belief Networks for Scalable Unsupervised Learning of Hierarchical Representations," Proceedings of the 26th International Conference on Machine Learning, Montreal, Canada, 2009, 8 pages.
Peng Li et al., "Probabilistic Models for Inference about Identity," IEEE Transactions on Pattern Analysis and Machine Intelligence, vol. 34, No. 1, pp. 144-157, Jan. 2012, 14 pages.
Ce Liu et al., "Face Hallucination: Theory and Practice," International Journal of Computer Vision, Feb. 2007, 34 pages.
Gregoire Montavon et al., "Neural Networks: Tricks of the Trade," Second Edition, Springer, 2012, 9 pages.
Jiquan Ngiam et al., "Multimodal Deep Learning," 28th International Conference on Machine Learning, Bellevue, WA, USA, Jun.-Jul. 2011, 8 pages.
Qi Yin et al., "An Associate-Predict Model for Face Recognition," IEEE Conference on Computer Vision and Pattern Recognition(CVPR), Jun. 2011, pp. 497-504, 8 pages.
Ruslan Salakhutdinov et al., "Deep Boltzmann Machines," Journal of Machine Learning Research, 2009, pp. 448-455, 8 pages.
Jitao Sang et al., "Face Image Quality Evaluation for ISO/IEC Standards 19794-5 and 29794-5," ICB, 2009, LNCS 5558, Springer, pp. 229-238, 10 pages.
Pierre Sermanet et al., "Pedestrian Detection with Unsupervised Multi-Stage Feature Learning," IEEE Conference on Computer Vision and Pattern Recognition (CVPR), Jun. 2013 , pp. 3626-3633, 8 pages.
Nitish Srivastava et al., "Learning Representations for Multimodal Data with Deep Belief Nets," ICML Representation Learning Workshop, Edinburgh, Scotland, UK, 2012, 8 pages.
Jinli Suo et al., "A Compositional and Dynamic Model for Face Aging," Jan. 2009, 17 pages.
Matthew Turk et al., "Eigenfaces for Recognition," Journal of Cognitive Neuroscience, vol. 3, No. 1, pp. 71-86, 1991, 16 pages.
Sibt Ul Hussain et al., "Face Recognition using Local Quantized Patterns," British Machine Vision Conference, Sep. 2012, 11 pages.

(56) References Cited

OTHER PUBLICATIONS

Paul Viola et al., "Rapid Object Detection using a Boosted Cascade of Simple Features," IEEE Conference on Computer Vision and Pattern Recognition (CVPR), 2001, 9 pages.
Andrew Wagner et al., "Towards a Practical Face Recognition System: Robust Alignment and Illumination by Sparse Representation," IEEE Transactions on Pattern Analysis and Machine Intelligence, vol. 34, No. 2, Feb. 2012, 14 pages.
Xiaogang Wang et al., "A Unified Framework for Subspace Face Recognition," IEEE Transactions on Pattern Analysis and Machine Intelligence, vol. 26, No. 9, pp. 1222-1228, Sep. 2004, 7 pages.
Xiaogang Wang et al., "Face Photo—Sketch Synthesis and Recognition," IEEE Transactions on Pattern Analysis and Machine Intelligence, vol. 31, No. 11, pp. 1955-1967, Nov. 2009, 13 pages.
G.A. Watson, "Characterization of Subdifferential of Some Matrix Norms," Linear Algebra and its Applications, vol. 170, pp. 33-45, Elsevier Science Publishing Co., Inc., Jun. 1992, 13 pages.
Chenyu Wu et al., "Automatic Eyeglasses Removal from Face Images," 5th Asian Conference on Computer Vision (ACCV), Jan. 2002, 6 pages.
Alan Yuille et al., "The Concave-Convex Procedure (CCCP)," Appearing in Neural Computation, vol. 15, No. 4, pp. 915-936. Apr. 2003, 33 pages.

\* cited by examiner

METHODS AND SYSTEMS FOR VERIFYING FACE IMAGES BASED ON CANONICAL IMAGES

CROSS-REFERENCES TO RELATED APPLICATIONS

The application is filed under 35 U.S.C. § 111(a) as a continuation of International Application No PCT/CN2014/000389, filed Apr. 11, 2014, entitled "Methods and Systems for Verifying Face Images Based on Canonical Images," which is incorporated herein by reference in its entirety for all purposes canonical images.

TECHNICAL FIELD

The present application relates to a method and a system for verifying face images, in particular, to a method and a system for verifying face images based on canonical images.

BACKGROUND

Face images in the wild will undergo large intra-personal variations, such as in poses, illuminations, occlusions and resolutions. Dealing with variations of face images is the key challenge in many face-related applications.

To deal with face variation, there are methods for face normalization in which an image in a canonical view frontal pose and neutral lighting) is recovered from a face image under a large pose and a different lighting. The face normalization methods can be generally separated into two categories: 3D- and 2D-based face reconstruction methods. The 3D-based methods aim to recover the frontal pose by 3D geometrical transformations. The 2D-based methods infer the frontal pose with graphical models, such as Markov Random Fields (MU), where the correspondences are learned from images in different poses. The above methods have certain limitations, such as capturing 3D data adds additional cost and resources, and 2D face synthesis depends heavily on good alignment, while the results are often not smooth on real-world images. Furthermore, these methods were mostly evaluated on face images collected under controlled conditions, either in employed 3D information or in controlled 2D environment.

Therefore, to address at least one or more of the above problems, it is desirable to provide a system and a method for verifying face images based on canonical images in which the canonical image for each identity can be automatically selected or synthesized so that the intra-person variances are reduced, while the inter-person discriminative capabilities are maintained.

SUMMARY

The present application proposes a new face reconstruction network that can reconstruct canonical images from face images in arbitrary wild conditions. These reconstructed images may dramatically reduce the intra-personal variances, while maintaining the inter-personal discriminative capability. Furthermore, the face reconstruction approach can be used for face verification.

In an aspect of the present application, a method for verifying face images based on canonical images is disclosed. The method may comprise:

a step of retrieving, from a plurality of face images of an identity, a face image with a smallest frontal measurement value as a representative image of the identity;

a step of determining parameters of an image reconstruction network based on mappings between the retrieved representative image and the plurality of face images of the identity;

a step of reconstructing, by the image reconstruction network with the determined parameters, at least two input face images into corresponding canonical images respectively; and a step of comparing the reconstructed canonical images to verify whether they belong to a same identity, wherein the representative image is a frontal image and the frontal measurement value represents symmetry of each face image and sharpness of the image.

In another aspect of the present application, a system for verifying face images based on canonical images is disclosed. The system may comprise:

a retrieving unit configured to retrieve, from a plurality of face images of an identity, a face image with a smallest frontal measurement value as a representative image of the identity;

an image reconstruction unit configured to reconstruct the input face images into corresponding canonical images respectively;

a determining unit configured to determine parameters of the image reconstruction unit, wherein the parameters is determined based on mappings between the representative image retrieved by the retrieving unit and the plurality of face images of the identity; and a comparing unit configured to compare the canonical images reconstructed by the image reconstruction network to verify whether they belong to a same identity, wherein the representative image is a frontal image and the frontal measurement value represents symmetry of each face image and sharpness of the image.

DETAILED DESCRIPTION

Reference will now be made in detail to exemplary embodiments, examples of which are illustrated in the accompanying drawings. When appropriate, the same reference numbers are used throughout the drawings to refer to the same or like part.

Figure 1:
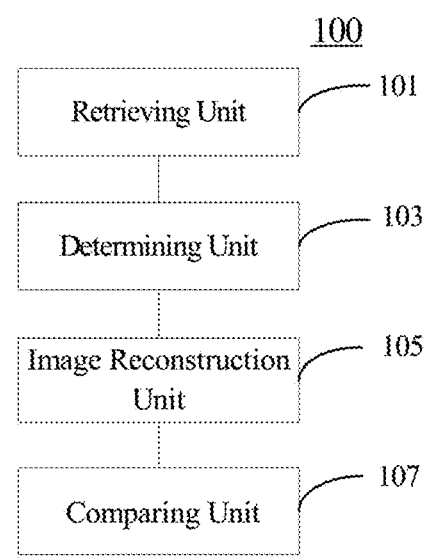
FIG. 1 is a schematic diagram illustrating a system for verifying face images based on canonical images according to one embodiment of the present application.

FIG. 1 is a schematic diagram illustrating a system 100 for verifying face image based on canonical images according to one embodiment of the present application. It shall be appreciated that the system 100 may be implemented using certain hardware, software, or a combination thereof. In addition, the embodiments of the present invention may be adapted to a computer program product embodied on one or more computer readable storage media (comprising but not limited to disk storage, CD-ROM, optical memory and the like) containing computer program codes. In the case that the system 100 is implemented with software, the system 100 may include a general purpose computer, a computer cluster, a mainstream computer, a computing device dedicated for providing online contents, or a computer network comprising a group of computers operating in a centralized or distributed fashion.

As shown in FIG. 1, the system 100 according to one embodiment of the present application may include a retrieving unit 101, a determining unit 103, an image reconstruction unit 105 and a comparing unit 107.

The retrieving unit 101 may retrieve, from a plurality of face images of an identity, a face image with a smallest frontal measurement value as a representative image of the identity, wherein the representative image is a frontal image and the frontal measurement value represents symmetry of each face image and sharpness of the image. Herein, the sharpness of an image refers to a rank of the matrix of the image.

In an embodiment of the present application, the retrieving unit 101 may include a calculating unit (not shown). The calculating unit may calculate the frontal measurement value of each of the plurality of face images, which will be discussed later. Those face images may be collected from the existing face database or web. In another embodiment of the present application, the retrieving unit 101 may include a ranking unit (not shown) which may rank the frontal measurement value calculated by the calculating unit in accordance with an increasing or decreasing order. Accordingly, the retrieving unit 101 may set the first or the last face image as the representative image of the identity.

Figure 4:
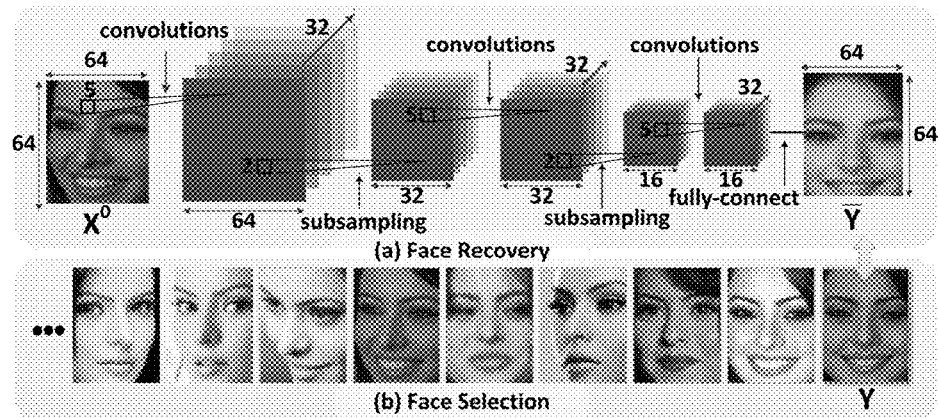
FIG. 4 is a schematic diagram illustrating pipelines of an image reconstruction network according to one embodiment of the present application.

The determining unit 103 may determine parameters of the image reconstruction unit 105. The image reconstruction unit 105 may reconstruct any input face image into corresponding canonical image, wherein the canonical images are frontal face images under neutral illumination. As shown in FIG. 4, the image reconstruction unit 105 may be formed in a form of the image reconstruction network, which may be a multilayer neural network. In one embodiment of the present application, the parameters of the image reconstruction unit 105 may be determined based on mappings between the representative image retrieved by the retrieving unit 101 and the plurality of face images of the identity. Then, any input face image may be reconstructed by the image reconstruction unit 105 with the determined parameters into the canonical image. In another embodiment of the present application, the determining unit 103 may also determine the parameters of the image reconstruction network 105 based on the transformation between the face images of an identity and the canonical images of the same identity reconstructed by the image reconstruction network 105. That is, the step of determining and the step of reconstructing may be performed repeatedly such that the parameters of the unit 105 can be optimized constantly.

The comparing unit 107 may compare the canonical images reconstructed by the image reconstruction network 105 to verify whether they belong to a same identity. In one embodiment of the present application, the image reconstruction network 105 may comprise a plurality of layers of sub-networks, and the determining unit 103 may determine preliminary parameters of each layer of the image reconstruction neural network based on the mappings by inputting an image training set, wherein an output of the previous layer of sub-network is inputted into a current layer of sub-network during the determining; compare an output of the last layer of sub-network and an expected target to obtain an error therebetween; and based on the obtained error, to fine-tune the preliminary parameters to concrete all parameters of the image reconstruction network. For example, as shown in FIG. 4, the network includes a plurality of convolution layers, sub-sampling layers and fully-connect layer. The step of determining will be discussed in details later.

Figure 2:
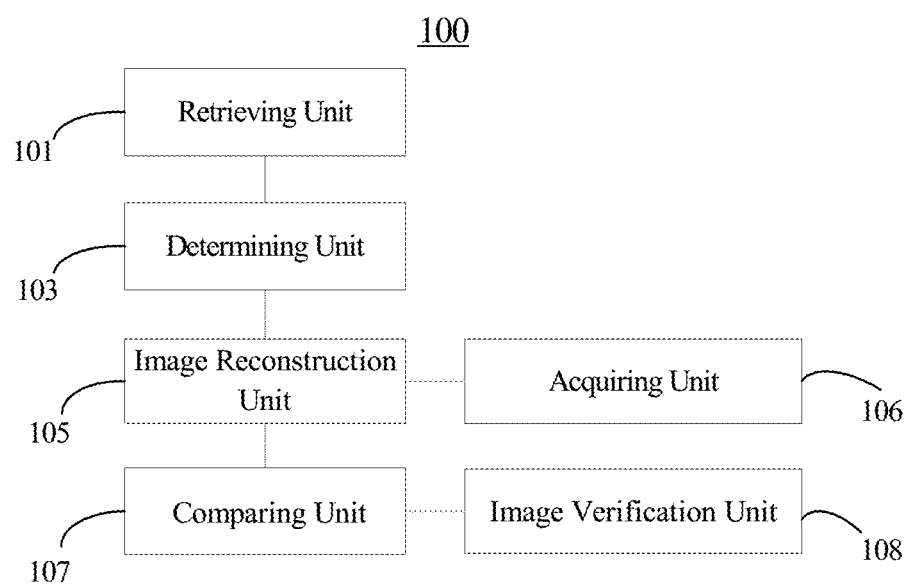
FIG. 2 is a schematic diagram illustrating a system for verifying face images based on canonical images according to another embodiment of the present application.
Figure 3:
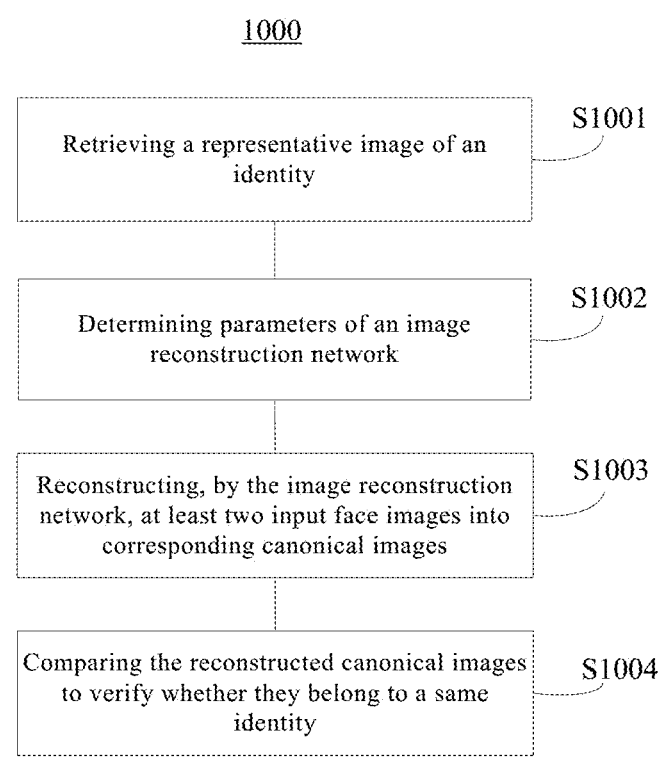
FIG. 3 is a schematic diagram illustrating a method for verifying face images based on canonical images according to one embodiment of the present application.

In one embodiment of the present application, as shown in FIG. 2, the system 100 may further include an acquiring unit 106 and an image verification unit 108, wherein the image verification unit 108 may be formed in a form of a multilayer image verification neural network as illustrated in FIG. 3. In particular, the acquiring unit 106 may acquire a similarity between any two reconstructed canonical images. The image verification network 108 may verify whether or not a pair of face images belong to a same identity. According to one embodiment of the application, the parameters of the image verification network 108 may be determined by the determining unit 103 based on the similarity between any two reconstructed canonical images acquired by the acquiring unit 106.

In one embodiment of the present application, the system 100 may further include a selecting unit (not shown) which may select one or more facial components from each of the reconstructed canonical images respectively to form one or more facial component pairs, each including facial components corresponding to the same face regions in the canonical images respectively. The acquiring unit 106 may acquire similarity between the facial component pairs and the determining unit 103 may determine the parameters of the image verification network 108 based on the similarity between the facial component pairs acquired by the acquiring unit 106. In an embodiment of the present application, the determining unit 103 may determine the parameters of the network 108 both based on the similarity between the reconstructed face images and the similarity between the facial component pairs.

In one embodiment of the present application, the system 100 may include one or more processors (not shown). Processors may include a central processing unit ("CPU"), a graphic processing unit ("GPU"), or other suitable information processing devices. Depending on the type of hardware being used, processors can include one or more printed circuit boards, and/or one or more microprocessor chips. Furthermore, processors can execute sequences of computer program instructions to perform the process 1000 that will be explained in greater detail below.

In summary, the present system has three key contributions. Firstly, to the best of our knowledge, canonical face images can be reconstructed by using only 2D information from face images in the wild. A new deep reconstruction network is introduced that combines representative face selection and face reconstruction, which shows state-of-the-art performance on face verification in the wild. Secondly, the reconstructed images are of high-quality. Significant improvement of the existing approaches can be demonstrated, when they adopt our method as a normalization step. Thirdly, a face dataset six times larger than the LFW dataset can be contributed.

FIG. 3 illustrates a flowchart of the process 1000 for verifying face images based on canonical images according to one embodiment of the present application, which will be discussed in details as below.

At step S1001, a face image with a smallest frontal measurement value may be retrieved from a plurality of face images of the identity as a representative image of the identity.

At this step, the plurality of face images of the identity may be collected from such as existing image databases or web. The plurality of face images are under arbitrary pose and illumination. Then, for each of the plurality of the face images, a frontal measurement value is calculated. Then the face image with the smallest value may be set to be the representative image of the identity. The representative image is a frontal face image under neutral illumination of the identity. In an embodiment of the application, after the frontal measurement value is calculated, these values may be ranked in decreasing order, and the last one is set to be the representative image of the identity. Alternatively, after the frontal measurement value is calculated, these values may be ranked in increasing order, and the first one is set to be the representative image of the identity.

In particular, a plurality of face images of an identity i are collected in a set of images $D_i$, in which a matrix $Y_i \in D_i$ denotes a face image in the set of face image $D_i$. The above-mentioned frontal measurement value is formulated as the following equation (1):

$$M(Y_i) = \|Y_i P - Y_i Q\|_F^2 - \lambda \|Y_i\|_*, \quad \text{Equation (1)}$$

where $Y_i \in R^{2a \times 2a}$, $\lambda$ is a constant coefficient, $\|\cdot\|_F$ is the Frobenius norm, $\|\cdot\|_*$ denotes the nuclear norm, which is the sum of the singular values of a matrix, $P, Q \in R^{2a \times 2a}$ are two constant matrixes with $P=\text{diag}([1_a, 0_a])$ and $Q=\text{diag}([0_a, 1_a])$, where $\text{diag}(\cdot)$ indicates a diagonal matrix.

The $M(Y_i)$ in Eq.(1) represents symmetry and sharpness of a face image of an identity. The first term in Eq.(1) measures the face's symmetry, which is the difference between the left half and the right half of the face. Obviously, smaller value of the first term indicates the face is more symmetric. The second term in Eq. (1) measures a rank of a matrix of the face image. Rank means the maximum number of linearly independent columns in a matrix. For example, if a face image is blurring or is a side-face (a background appears in another side of the image, which are generally blocks of solid color in a scale similar to "a big close-up"), the number of the linearly independent columns is relatively smaller, thus the value of the second term (with a minus sign) is relatively bigger. Therefore, the smaller value of Eq. (1) indicates the face is more likely to be in frontal view, more symmetrical, more clear and without very littler posture change. With this measurement by combining the symmetry and rank of matrix, a frontal image of the identity under neutral lighting can be automatically obtained with high efficiency.

At step S1002, based on the mappings between the representative image retrieved at step S1001 and the plurality of face images of the identity, parameters of the image reconstruction network 105 (such as illustrated in FIG. 4) may be determined.

It is noted that the step of determining may be performed repeatedly for any identity. For example, in another embodiment of the application, for the identity the representative image $Y_i$ may be selected from the set of images $D_i$ by a sparse linear combination $Y_i = \alpha_{i1} D_{i1} + \alpha_{i2} D_{i2} + \ldots + \alpha_{ik} D_{ik}$, with $D_{ik}$ being the k-th image in the set $D_i$ (herein, also referred to as face selection, shown in FIG. 4). Let $Y_i = \alpha_i D_i$, where $\alpha_i = [\alpha_{i1}, \alpha_{i2}, \ldots, \alpha_{ik}]$ is the coefficient vector and it is expected to be sparse. Furthermore, the incoherence between the selected face images of different identities is needed to be enforced, which is achieved by adding a regularization term $$\sum_{i \neq j} \|Y_i^T Y_j\|_F^2.$$

This is to maintain the discriminative ability of the reconstructed frontal view images. Thus, the face selection can be formulated as below:

$$\min_{\{Y_i, \alpha_i\}} \sum_i \{\|Y_i - \alpha_i D_i\|_F^2 + M(Y_i)\} + \eta \sum_{i \neq j} \|Y_i^T Y_j\|_F^2 \quad \text{Equation (2)}$$
$$\text{s.t.} \quad \|\alpha_i\|_1 \leq \varepsilon$$

where $M(Y_i)$ is defined in Eq. (1). The optimization problem in Eq. (2) in terms of both Y and $\alpha$ is not convex. However, if Y is fixed, the problem with regard to $\alpha$ is a Lasso problem that is convex and if $\alpha$ is fixed, the function of Y is separated into a convex term plus a concave term, which is the minus nuclear norm. This can be solved by the concave-convex procedure (CCCP).

At step S1003, at least two input face image are reconstructed into their corresponding canonical images by the image reconstruction network. That is, the image reconstruction network may reconstruct any face images under arbitrary pose into corresponding canonical images which are frontal and under neutral illumination (herein also referred to as face recover, shown in FIG. 4). In particular, the face images may be by minimizing the loss error as below:

$$E(\{X_{ik}^0\}; W) = \sum_i \sum_k \|Y_i - f(X_{ik}^0; W)\|_F^2 \quad \text{Equation (3)}$$

where i is the index of identity and k indicates the k-th sample of identity i, $X^0$ and Y denote a training image and a target image respectively. W is a set of parameters of the image reconstruction network.

In an embodiment of the present application, the parameters of the image reconstruction network may also be determined based on transformation between an input face image and the corresponding canonical images reconstructed by the network 105. Then, any face images can be reconstructed by using the image reconstruction network in which the parameters have been determined. The mapping means a transformation from one vector to another vector. Herein, the mapping may refer to a sequential non-linear mapping to transform an input image of the plurality of face images of the identity to the canonical view image of the same identity.

As shown in FIG. 4, the image reconstruction network contains a plurality of convolution layers. For example, there may be 3 layers as shown in FIG. 4, and the first two convolution layers are followed by a max pooling layers and the last one is followed by a fully-connect layer. Different from the conventional convolutional neural network (CNN), whose filters share weights, the filters in the network are localized and do not share weights because it is assumed herein different face regions should employ different features. It is noted that although only the input $X^0$, the output $\overline{Y}$ (predicted image), and the target Y are shown in FIG. 4 in the size of 64×64, these matrixes may be in any size which is known for the skilled in the art.

Referring to FIG. 4 again, firstly all images are transformed to gray-scale and their illuminations are corrected as known in the art and thus the detailed description thereof is omitted herein. At each convolutional layer, a plurality of (for example, 32) output channels are obtained by learning non-shared filters, each of which is in the size of, for example, 5×5. The cell size of the sub-sampling layer is 2×2. The i-th convolutional layer may be formulated as below:

$$X_{q,uv}^{l+1} = \sigma(\Sigma_{p=1}^{l} W_{pq,uv}^{l} \circ (X_p^{l})_{uv} + b_q^{l}), \quad \text{Equation (4)}$$

where $W_{pq,uv}^{l}$ and $(X_p^{i})_{uv}$ denote the filter and the image patch at the image location (u,v), respectively, p,q are the indexes of input and output channels. For instance, in the first convolutional layer, p=1,q=1, . . . , 32. Thus, $X_{q,uv}^{l+1}$ indicates the q-th channel output at the location (u,v); that is the input to the l+1-th layer. $\sigma(x)=\max(0,x)$ is the rectified linear function and $\circ$ indicates the element-wise product. The bias vectors are denoted as b. At the fully-connect layer, the face image $\overline{Y}$ is reconstructed by the following equation:

$$\overline{Y} = W^L X^L + b^L, \quad \text{Equation (5)}$$

In an embodiment of the present application, the face selection and the face recovery may be jointly learned by combining Eq. (2) and Eq. (3) an optimized separately for each identity as below:

$$\min_{Y_i, \alpha_i, W} \sum_k \|Y_i - f(X_{ik}^0; W)\|_F^2 + \quad \text{Equation (6)}$$
$$\gamma \|Y_i - \alpha_i D_i\|_F^2 + \tau \|\alpha_i\|_1 + \eta' \|Y_i\|_F^2 - \lambda \|Y_i\|_*,$$

where $\gamma, \tau, \lambda, \eta'$ are the balancing parameters of the regularization terms. Eq. (6) indicates that each chosen image $Y_i$ must have frontal image, maintain discriminativeness, and minimize the loss error. The values of $Y_i, \alpha_i, W$ are searched iteratively using the following steps:

1. Updating $\alpha_i$ with $Y_i$ and W fixed: With respect to $\alpha_i$, Eq. (6) becomes a Lasso problem, which can be efficiently solved by the fast iterative shrinkage-thresholding algorithm (FISTA);
2. Updating $Y_i$ with $\alpha_i$ and W fixed: This problem includes three convex terms (Frobenius norms) and a concave term (nuclear norm), which means it cannot guarantee optima. The iterative update rule is $$Y_i^{t+1} \leftarrow \frac{1}{2(k+\gamma+\eta')} \left(2 \sum_k f(X_{ik}^0) + 2\gamma \alpha_i D_i + \lambda \tilde{U} \tilde{V}^T\right), \quad \text{Equation (7)}$$

where $\tilde{U}$ and $\tilde{V}$ are the truncations of U and V to the first rank $(Y_i^t)$ columns, wherein $Y_i^t = U\Sigma V^T$ is the SVD of $Y_i^t$.
3. Updating W with $\alpha_i$ and $Y_i$ fixed: This problem is non-linear because of the activation functions in the image reconstruction network. It can be solved by the stochastic gradient descent (SGD) with back propagation.

In an embodiment of the present application, a simple and practical training procedure as illustrated in the following algorithm is devised to estimate W first by using all the training examples and then to select target for each identity, in order to speed up the above iterating procedure of the three steps.

Input: face images of all identities $\{X_{ij}^0\}$
Output: target $\{Y_i\}$ and network parameters W
Initialization: t=0; initialize W by unsupervised feature learning; for each identity i, let $Y_i^t \in D_i$ be the image with the smallest value of Eq.(1);

-continued

While t < T do
    for each $X_{ij}^0$ do
        Update W by stochastic gradient descent
    end
    for each identity i do
        Compute $Y_i'$ using Eq. (7)
        Let $Y_i^{t+1} \in D_i$ be the image closest to $Y_i'$;
    end
end And then, at step S1004, the canonical images reconstructed at step S1003 are compared to verify whether they belong to a same identity, that is, to verify whether face images corresponding to the canonical images respectively belong to the same identity.

Figure 5:
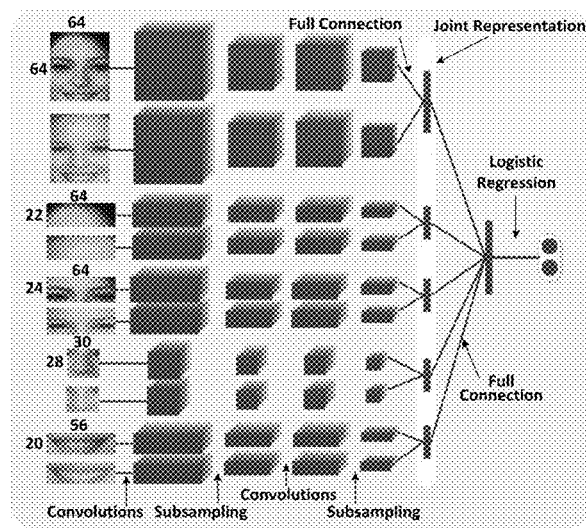
FIG. 5 is a schematic diagram illustrating architecture of an image verification network according to one embodiment of the present application.

In an embodiment of the application, the method 1000 may further comprise a step of acquiring a similarity between any two reconstructed canonical images to determine parameters of an image verification network, and the architecture of the network is shown in FIG. 5. Then, the image verification network with the determined parameters may verify whether the reconstructed canonical images belong to the same identity.

In another embodiment of the application, the method 1000 may further comprise a step of selecting one or more facial components from each of the reconstructed canonical images respectively to form one or more facial component pairs, each including facial components corresponding to the same face regions in the canonical images respectively. In another embodiment of the application, the method 100 may further comprise a step of acquiring the similarity between the facial component pairs to train the parameters of the image verification network.

According to the present application, the image verification network is developed to learn hierarchical feature representations from pairs of reconstructed canonical face images. These features are robust for face verification, since the reconstructed images already remove large face variations. It also has potential applications to other problems, such as face hallucination, face sketch synthesis and recognition.

As shown in FIG. 5, the reconstructed canonical images may be used as input to the image verification network, in which the parameters are trained based on both the similarity between the facial component pairs and the similarity between the reconstructed canonical images.

Referring to FIG. 5, the image verification network contains five CNNs, each of which takes a pair of whole face images or facial components, such as forehead, nose, eyes, and mouth, as input. The sizes of the whole face, forehead, eye, nose, and mouth shown in FIG. 5 are 64×64, 22×64, 24×64, 28×30 and 20×56, respectively. It is noted that although forehead, eye, nose, and mouth in FIG. 5 are shown as the selected face regions, any other face regions with different sizes may be selected in the present application. In the image verification network shown in FIG. 5, each CNN has two convolutional layers and two sub-sampling layers, which are arranged in an alternative fashion. Each CNN further includes a full-connection layer. Similar to the image reconstruction network, the filters of the convolutional layers are not shared.

In the image verification network, each CNN learns a joint representation of the facial component pairs or the face images to train the preliminary parameters of each layer of the CNNs. During the training, an output of the previous layer is inputted into a current layer. Then, an output of the last layer and an expected target is compared to obtain an error. Then, based on the obtained error, the logistic regression layer fine-tune the preliminary parameters so as to concatenate all the joint representations as features to predict whether the two face images belong to the same identity.

In particular, as to the training of the image verification network, the filters are firstly trained by the unsupervised feature learning. Then the image verification network is fine-tuned by using the stochastic gradient descent (SGD) combined with back-propagation which is known in the art. Similar to the training of the image reconstruction network, the back-propagation error are passed backwards and then the fully-connect weights or filters are updated in each layer. A entropy error is adopted instead of the loss error because the labels y are needed to be predicted as below:

$$\mathrm{Err} = y \log \bar{y} + (1-y) \log(1-\bar{y}) \quad \text{Equation (8)}$$

where $\bar{y}$ are the predicted labels and $y, \bar{y} \in \{0, 1\}$ with 1 indicating the input images belong to the same identity, and 0 otherwise.

The embodiments of the present application may be implemented using certain hardware, software, or a combination thereof. In addition, the embodiments of the present invention may be adapted to a computer program product embodied on one or more computer readable storage media (comprising but not limited to disk storage, CD-ROM, optical memory and the like) containing computer program codes.

In the foregoing descriptions, various aspects, steps, or components are grouped together in a single embodiment for purposes of illustrations. The disclosure is not to be interpreted as requiring all of the disclosed variations for the claimed subject matter. The following claims are incorporated into this Description of the Exemplary Embodiments, with each claim standing on its own as a separate embodiment of the disclosure.

Embodiments and implementations of the present application have been illustrated and described, and it should be understood that various other changes may be made therein without departing form the scope of the application.

What is claimed is:

1. A method for verifying face images based on canonical images, the method comprising:
   retrieving, from a plurality of face images of an identity, a face image with a smallest frontal measurement value as a representative image of the identity;
   determining parameters of an image reconstruction network based on mappings between the retrieved representative image and the plurality of face images of the identity;
   reconstructing, by the image reconstruction network with the parameters of the image reconstruction network, at least two input face images into corresponding canonical images; and
   comparing the reconstructed canonical images to verify whether the reconstructed canonical images belong to a same identity,
   wherein the representative image is a frontal image and a frontal measurement value represents symmetry of a face image and sharpness of the face image.

2. The method according to claim 1, further comprising:
   adjusting, after reconstructing the at least two input face images, the parameters of the image reconstruction network based on transformation between an input face image and the corresponding reconstructed canonical image.

3. The method according to claim 1, wherein the image reconstruction network comprises a plurality of layers of sub-networks, and determining the parameters of the image reconstruction network comprises:
   determining preliminary parameters of each layer of the image reconstruction network based on the mappings by inputting an image training set, wherein an output of a previous layer of sub-network is inputted into a current layer of sub-network during the determining;
   comparing an output of a last layer of sub-network and an expected target to obtain an error therebetween; and
   fine-tuning, based on the obtained error, the preliminary parameters to concrete the parameters of the image reconstruction network.

4. The method according to claim 1, further comprising:
   acquiring, before comparing the reconstructed canonical images, a similarity between any two reconstructed canonical images to determine parameters of an image verification network.

5. The method according to claim 4, further comprising:
   selecting one or more facial components from each of the reconstructed canonical images respectively to form one or more facial component pairs, each facial component pair including facial components corresponding to same face regions in the reconstructed canonical images respectively; and
   acquiring a similarity between the one or more facial component pairs to determine the parameters of the image verification network.

6. The method according to claim 1, wherein the frontal measurement value $M(Y_i)$ is formulated by rule of:

$$M(Y_i) = \|Y_i P - Y_i Q\|_F^2 - \lambda \|Y_i\|_*$$

where $Y_i \in D_i$ denotes a face image in a set of face images $D_i$,
$\lambda$ is a constant coefficient,
$\|\cdot\|_F$ is the Frobenius norm,
$\lambda \|\cdot\|_*$ is the nuclear norm, and
P and Q represent two constant matrixes with $P = \text{diag}([1_a, 0_a])$ and $Q = \text{diag}([0_a, 1_a])$, where $\text{diag}(\cdot)$ indicates a diagonal matrix.

7. A system for verifying face images based on canonical images, the system comprising:
   a memory storing one or more computer-executable components;
   a processor electrically communicated with the memory to execute the computer-executable components to perform operations of the system, wherein the computer-executable components comprise:
     a retrieving component configured to retrieve, from a plurality of face images of an identity, a face image with a smallest frontal measurement value as a representative image of the identity;
     an image reconstruction component configured to reconstruct input face images into corresponding canonical images;
     a determining component configured to determine parameters of the image reconstruction component, wherein the parameters are determined based on mappings between the representative image retrieved by the retrieving component and the plurality of face images of the identity; and
     a comparing component configured to compare the canonical images reconstructed by the image reconstruction component to verify whether the canonical images belong to a same identity, wherein the representative image is a frontal image and a frontal measurement value represents symmetry of a face image and sharpness of the face image.

8. The system according to claim 7, wherein the determining component is further configured to adjust the parameters of the image reconstruction component based on transformation between an input face image and the corresponding reconstructed canonical image.

9. The system according to claim 8, wherein the computer-executable components further comprise:
an acquiring component configured to acquire a similarity between any two reconstructed canonical images; and
an image verification component configured to verify whether a pair of face images belong to a same identity, wherein the determining component is further configured to determine parameters of the image verification component based on the similarity between any two reconstructed canonical images acquired by the acquiring component.

10. The system according to claim 9, wherein the computer-executable components further comprise:
a selecting component configured to select one or more facial components from each of the reconstructed canonical images respectively to form one or more facial component pairs, each facial component pair including facial components corresponding to same face regions in the reconstructed canonical images respectively;
wherein the acquiring component is further configured to acquire a similarity between the one or more facial component pairs, and
wherein the determining component is further configured to determine the parameters of the image verification component based on the similarity between the one or more facial component pairs acquired by the acquiring component.

11. The system according to claim 9, wherein the image verification component is formed as a multilayer image verification neural network.

12. The system according to claim 7, wherein the image reconstruction component is formed as a multilayer image reconstruction neural network.

13. The system according to claim 12, wherein:
the image reconstruction neural network comprises a plurality of layers of sub-networks, and the determining component is further configured to determine preliminary parameters of each layer of the image reconstruction neural network based on the mappings by inputting an image training set, wherein an output of a previous layer of sub-network is inputted into a current layer of sub-network during the determining; and
the determining component is further configured to compare an output of a last layer of sub-network and an expected target to obtain an error therebetween; and based on the obtained error, fine-tune the preliminary parameters to concrete the parameters of the image reconstruction neural network.

14. The system according to claim 7, wherein the frontal measurement value is formulated by the following equation:

$$M(Y) = \|Y_i P - Y_i Q\|_F^2 - \lambda \|Y_i\|_*$$

where $Y_i \in D_i$ denotes a face image in a set of face images $D_i$,
$\lambda$ is a constant coefficient,
$\|\cdot\|_F$ is the Frobenius norm,
$\|\cdot\|_*$ is the nuclear norm, and P and Q represent two constant matrixes with $P=\text{diag}([1_a, 0_a])$ and $Q=\text{diag}([0_a, 1_a])$, where $\text{diag}(\cdot)$ indicates a diagonal matrix.

15. A method for verifying face images based on canonical images, the method comprising:
retrieving a face image with a smallest frontal measurement value from a plurality of face images of an identity as a representative image of the identity, wherein the representative image is a frontal image, and wherein a frontal measurement value represents symmetry of a respective face image and sharpness of the respective face image;
determining parameters of an image reconstruction network based on mappings between the retrieved representative image and the plurality of face images of the identity;
reconstructing, by the image reconstruction network with the determined parameters of the image reconstruction network, at least two input face images into corresponding canonical images;
acquiring a similarity between any two reconstructed canonical images to determine parameters of an image verification network; and
verifying whether the reconstructed canonical images belong to a same identity by the image verification network with the determined parameters of the image verification network.

16. The method of claim 15, wherein the image reconstruction network comprises a plurality of layers of sub-networks, and the determining the parameters of the image reconstruction network comprises:
determining preliminary parameters of each layer of the image reconstruction network based on the mappings by inputting an image training set, wherein an output of a previous layer of sub-network is inputted into a current layer of sub-network during the determining;
comparing an output of a last layer of sub-network and an expected target to obtain an error therebetween; and
fine-tuning, based on the obtained error, the preliminary parameters to concrete the parameters of the image reconstruction network.

17. The method of claim 15, further comprising:
selecting one or more facial components from each of the reconstructed canonical images respectively to form one or more facial component pairs, each facial component pair including facial components corresponding to same face regions in the reconstructed canonical images respectively;
acquiring a similarity between the one or more facial component pairs; and
determining the parameters of the image verification network based on the acquired similarity between any two reconstructed canonical images and the acquired similarity between the one or more facial component pairs.

18. A non-transitory computer-readable storage media storing one or more instructions executable to,
retrieve, from a plurality of face images of an identity, a face image with a smallest frontal measurement value as a representative image of the identity, wherein the representative image is a frontal image, and wherein a frontal measurement value represents symmetry of a respective face image and sharpness of the respective face image;

determine parameters of an image reconstruction network based on mappings between the retrieved representative image and the plurality of face images of the identity;
reconstruct, by the image reconstruction network with the determined parameters of the image reconstruction network, at least two input face images into corresponding canonical images;
acquire a similarity between any two reconstructed canonical images to determine parameters of an image verification network; and
verify whether the reconstructed canonical images belong to a same identity by the image verification network with the determined parameters of the image verification network.

* * * * *